(12) United States Patent
Wada

(10) Patent No.: US 6,494,585 B1
(45) Date of Patent: Dec. 17, 2002

(54) ILLUMINATION DEVICE, ELECTROOPTICAL DEVICE HAVING THE ILLUMINATION DEVICE AS FRONT LIGHT, AND ELECTRONIC EQUIPMENT

(75) Inventor: Hiroshi Wada, Horigune-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/674,856
(22) PCT Filed: Feb. 17, 2000
(86) PCT No.: PCT/JP00/00911
§ 371 (c)(1), (2), (4) Date: Nov. 8, 2000

(30) Foreign Application Priority Data

Mar. 15, 1999 (JP) .......................... 11-068500

(51) Int. Cl.$^7$ ................................ F21V 8/00
(52) U.S. Cl. ...................... 362/26; 362/31; 349/63
(58) Field of Search .................... 362/26, 31, 339, 362/327, 560; 385/146; 349/63

(56) References Cited

U.S. PATENT DOCUMENTS

| | | | |
|---|---|---|---|
| 5,608,550 A | * 3/1997 | Epstein et al. | 359/40 |
| 5,719,649 A | * 2/1998 | Shono et al. | 349/65 |
| 6,129,439 A | * 10/2000 | Hou et al. | 362/31 |
| 6,285,420 B1 | * 9/2001 | Mizumo et al. | 349/65 |

FOREIGN PATENT DOCUMENTS

| | | |
|---|---|---|
| EP | 0 878 720 A1 | 11/1998 |
| JP | 10-326515 | 12/1998 |
| JP | 2000-89225 | 3/2000 |
| JP | 2000-98383 | 4/2000 |

* cited by examiner

Primary Examiner—Sandra O'Shea
Assistant Examiner—Anabel Ton
(74) Attorney, Agent, or Firm—Oliff & Berridge PLC

(57) ABSTRACT

The surface of a light guide plate is provided with face portions obliquely oriented. Since the face portions form leakage lights whose directional components are deviated from the principal viewing direction on the surface of the light guide plate, the orientation distribution of the leakage light differs from the conventional one, and the peak orientations of the leakage light are formed on both sides of the viewing direction. Moreover, the peak intensities on both sides significantly decrease.

12 Claims, 8 Drawing Sheets

ILLUMINATION DEVICE, ELECTROOPTICAL DEVICE HAVING THE ILLUMINATION DEVICE AS FRONT LIGHT, AND ELECTRONIC EQUIPMENT

BACKGROUND OF THE INVENTION

1. Field of the Invention

The present invention relates to an illumination device and to an electrooptical device having the illumination device. More particularly, the present invention relates to a structure of an illumination device which may be suitably used as a front light which is placed in front of a display surface of an electrooptical device so as to illuminate the display surface in dark environments and to allow the display surface to be visible therethrough in a lighted environment.

2. Description of Related Art

Conventionally, reflective liquid crystal display panels that do not consume large amounts of power are used as electrooptical devices for use in display sections of portable devices. However, the displays are not readily visible in dim conditions, such as during the night. In contrast, since transmissive liquid crystal display panels have backlights, displays thereof are readily visible even under dim conditions. However, the backlights consume large amounts of power, and the displays are rather difficult to view outdoors in the daytime since the environment is bright.

In order to solve the above problems, a liquid crystal display device having a front light serving as a surface light-emitting element has been proposed in which a light guide plate is placed in front of a reflective liquid crystal display panel, light from a light source, such as a cold cathode-ray tube, placed adjacent to the end of the light guide plate, is introduced into the light guide plate, and the light is emitted from the surface of the light guide plate toward the liquid crystal display panel, thereby allowing the display to be visible even in a dim environment. In a liquid crystal display device having a front light, since the liquid crystal display panel is visible through the light guide plate in the daytime, it can be used as a normal reflective liquid crystal display panel. In a dim environment, the liquid crystal display panel is illuminated by lighting the front light, so that the display is visible through the light guide plate.

FIG. 11 schematically shows the general plan structure of a front light 20 for a conventional liquid crystal panel, and FIG. 12 is an enlarged general sectional view of the front light 20. The front light 20 may consist of a light source 21 formed of a cold cathode-ray tube or the like, a platelike light guide plate 22 made of a material having a high refractive index, such as acrylic resin, so as to introduce light from the light source 21 through an end face 22d and to guide the light to the right side in the figure, and a reflector 23 placed to surround the light source 21. On the surface of the light guide plate 22, gently inclined sections 22a inclined at a slight angle and steeply inclined sections 22b inclined at an angle greater than that of the gently inclined sections 22a are cyclically arranged to the right side in the figure. Cuneal projections formed by the gently inclined sections 22a and the steeply inclined sections 22b are formed in stripes so as to extend in the direction of the plane of the drawing paper. In contrast, a back surface 22c of the light guide plate 22 is flat.

When light is introduced from the light source 21 into the light guide plate 22, it is totally reflected by the inner surface of the light guide plate 22, and travels to the right side in the figure. When the light is totally reflected by the steeply inclined sections 22b, it is directed toward the back surface 22c, and is emitted as illumination light 22A from the back surface 22c in the downward direction in the figure. For this reason, light can be emitted downward from the surface of the light guide plate 22. When the light guide plate 22 is viewed from above, since it is made of a transparent material, a display formed therebelow is visible therethrough.

SUMMARY OF THE INVENTION

While light emitted from the light source 21 is emitted downward by using total reflection at the steeply inclined sections 22b in the above-described front light 20, it is not totally reflected, depending on the angle of light incident on the steeply inclined section 22b, and leakage light 22B leaks above the light guide plate 22, as is shown in the figure. Since the steeply inclined sections 22b are formed like bands in a direction orthogonal to the travel direction of propagating light that propagates inside In contrast, in some devices, the direction, in which the gently inclined sections 22a and the steeply inclined sections 22b are alternately arranged, is placed obliquely with respect to the principal viewing direction F, as shown by dotted-chain lines in FIG. 11. By doing this, since the intensity peak direction of the leakage light 22B is deviated from the principal viewing direction F, as shown by dotted-chain lines in FIGS. 9A–B and 10, visibility is improved. In this method, however, since the brightness peak direction of the display is also deviated with the deviation of the intensity peak of the leakage light 22B, the display is somewhat dimmed. Moreover, when viewed from the deviated direction, the deviated direction coincides with the intensity peak of the leakage light 22B, which rapidly deteriorates visibility.

Accordingly, the present invention aims to solve the above problems, and an object of the present invention is to prevent visibility from being deteriorated by controlling the leaking direction of leakage light emitted from the surface. of a light guide plate, and to thereby improve the performance as an illumination device.

In an exemplary embodiment of the present invention, an illumination device includes a light source, and a light guide plate for introducing light emitted from the light source from an end face and emitting the light from one surface thereof, wherein the other surface of the light guide plate opposing the one surface has a reflective face section for reflecting the light from the light source toward the one surface or emitting the light from the other surface according to the incident angle of the light, the reflective face section includes at least first and second faces, and the emitting direction of the light emitted from the first face and the emitting direction of the light emitted from the second face differ from each other. Herein, the light emitting direction means an emitting direction in which the light intensity is highest.

According to the illumination device of the present invention, even when leakage light leaks from the reflective face section toward the viewer, since the reflective face section includes the first and second faces and the first and second faces emit leakage light at different emitting angles, the leakage light is not collected in one direction, but is dispersed. Therefore, it is possible to prevent visibility from being deteriorated due to leakage light.

It is preferable to set the formation angles of the first and second faces so that leakage light is emitted from the first.

and second faces in directions different from the principal viewing direction. By doing this, it is possible to prevent a large amount of leakage light from being emitted in a direction identical to or close to the principal viewing direction, and to thereby improve visibility when viewed from the principal viewing direction.

In another embodiment of the illumination device of the present invention, an angle, formed by the emitting direction of light projected onto the surface of the light guide plate and emitted from the first face and the emitting direction of light projected onto the surface of the light guide plate and emitted from the second face, is between 0° and 180°.

According to this embodiment, even when the azimuth angle, at which the viewer views the light guide plate, is changed, since the first and second faces emit leakage light at different emitting angles, the leakage light is not collected in one direction, but is dispersed, which can prevent visibility from being deteriorated due to leakage light.

In a further embodiment of the illumination device of the present invention, the first face and the second face are formed alternately and continuously. For example, it is preferable that a plurality of reflective face sections be formed cyclically and repeatedly. In a case in which the reflective face sections are curved surfaces, it is preferable that the curved face sections be formed in a cyclic form. More particularly, it is preferable that the curved face sections be formed at sufficiently short intervals. This prevents brightness of illumination light and transmitted light from varying, and facilitates the production of the light guide plate.

High polymeric material having a high reflective index, such as acrylic resin, may be suitably used as the light guide plate used in the illumination device of the present invention. It is preferable that the reflective face sections be formed of inclined surfaces disposed at a predetermined angle to the plane parallel to one surface of the light guide plate.

An electrooptical device of another exemplary embodiment of the present invention includes an electrooptical element having an electrooptical layer disposed between a pair of substrates and a reflective film disposed on one side of the electrooptical layer; and an illumination device placed on the viewer side of the electrooptical element, and including a light source and a light guide plate for introducing light emitted from the light source from an end face and mainly emitting the light toward the electrooptical element, wherein a surface of the light guide plate on the viewer side is provided with a reflective face section for reflecting the light emitted from the light source toward the electrooptical element or emitting the light from the viewer-side surface according to the incident angle of the light, and a transmissive face section for allowing the electrooptical element to be visible therethrough from the viewer side, the reflective face section includes first and second faces, and the emitting direction of the light emitted from the first face and the emitting direction of the light emitted from the second face are different.

As the electrooptical element used in the electrooptical device of the present invention, a liquid crystal display device may be suitably used which uses a liquid crystal layer, such as an STN liquid crystal layer, an ECB liquid crystal layer, or a TN liquid crystal layer, as the electrooptical element.

According to the illumination device of another exemplary embodiment of the present invention, even when leakage light leaks from the reflective face section toward the viewer side, since the reflective face section includes the first and second faces and the first and second faces emit the leakage light at different emitting angles, the leakage light is not collected in one direction, but is dispersed, which can prevent visibility from being deteriorated due to leakage light.

It is preferable to set the formation angles of the first face and the second face so that the emitting directions of leakage light from the first face and the second face are different from the principal viewing direction. By doing this, a large amount of leakage light is prevented from being emitted in the direction identical to or close to the principal viewing direction, and visibility when viewed from the principal viewing direction can be improved.

In another embodiment of the electrooptical device of the present invention, an angle, formed by the emitting direction of light projected on the surface of the light guide plate and emitted from the first face and the emitting direction of light projected on the surface of the light guide plate and emitted from the second face, is between 0° and 180°.

According to this embodiment, even when the azimuth angle, at which the viewer views the electrooptical device, is changed, since the first and second faces emit leakage light at different emitting angles, the leakage light is not collected in one direction, but is dispersed, which prevents visibility from being deteriorated due to leakage light.

In a further embodiment of the electrooptical device of the present invention, the first face and the second face are formed alternately and continuously. For example, it is preferable that a plurality of reflective face sections be formed cyclically and repeatedly. In a case in which the reflective face sections are curved surfaces, it is preferable that the curved face sections be formed in a cyclic form. More particularly, it is preferable that the curved face sections be formed at sufficiently short intervals. This prevents brightness of illumination light and transmitted light from varying, and facilitates the production of the light guide plate.

A high polymeric material having a high refractive index, such as acrylic resin, may be suitably used as the light guide plate used in the electrooptical device of the present invention. It is preferable that the reflective face sections be formed of inclined surfaces disposed at a predetermined angle to the plane parallel to one surface of the light guide plate.

An electronic equipment of another exemplary embodiment of the present invention includes an electrooptical device as a display section, and an input device for supplying an image signal to the electrooptical device, wherein the electrooptical device includes an electrooptical element having an electrooptical layer disposed between a pair of substrates and a reflective film disposed on one side of the electrooptical layer, and an illumination device placed on the viewer side of the electrooptical element, and including a light source and a light guide plate for introducing light emitted from the light source from an end face and mainly emitting the light toward the electrooptical element, and wherein a surface of the light guide plate on the viewer side is provided with a reflective face section for reflecting the light emitted from the light source toward the electrooptical element or emitting the light from the viewer-side surface according to the incident angle of the light, and a transmissive face section for allowing the electrooptical element to be visible therethrough from the viewer side, the reflective face section includes first and second faces, and the emitting direction of the light emitted from the first face and the emitting direction of the light emitted from the second face are different.

DETAILED DESCRIPTION OF THE EMBODIMENTS

Next, embodiments of the present invention will be described in detail.

(First Embodiment)

Figure 1:
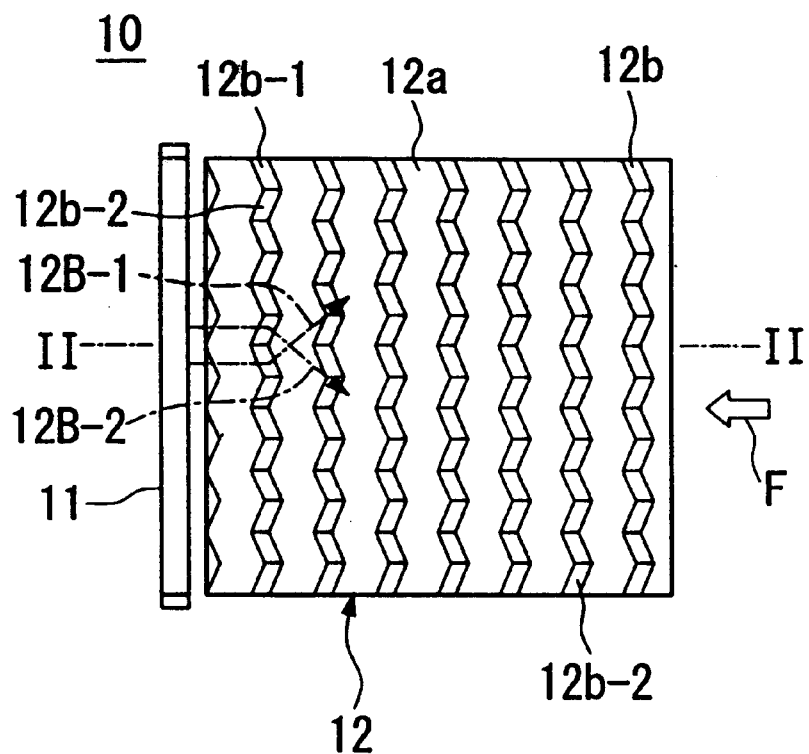
FIG. 1 is a general plan view schematically showing an illumination device according to a first embodiment of the present invention.
Figure 2:
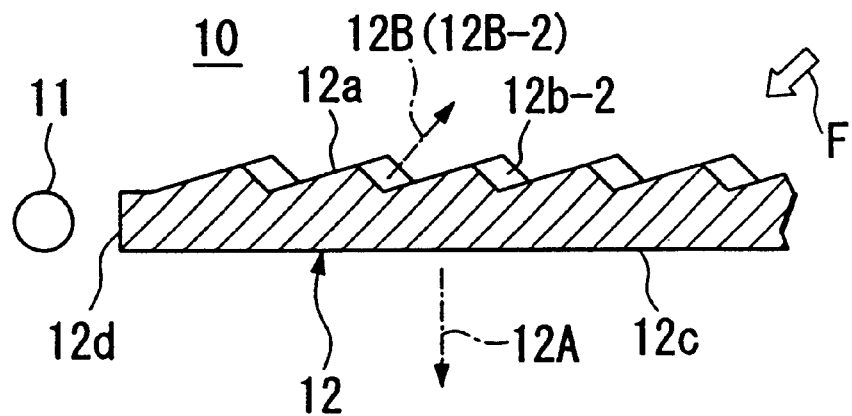
FIG. 2 is an enlarged general sectional view schematically showing the first embodiment.

FIG. 1 is a general plan view schematically showing the general structure of a front light 10 serving as an illumination device according to the present invention, and FIG. 2 is a general sectional view schematically showing the general structure of the front light 10, taken along line II—II in FIG. 1. In this embodiment, the front light 10 may include a light source 11 formed of a cold cathode-ray tube or the like, a transparent light guide plate 12 made of acrylic resin, polycarbonate resin, or the like, by injection molding or by other methods, so as to introduce light from an end face 12d serving as a light incident end face, and a reflector (not shown) for surrounding the light guide plate 22, the leakage light 22B is seen as bands when the display surface is viewed through the front light 20, which deteriorates visibility of the display surface placed below the front light 20.

The above leakage light 22B can be reduced by decreasing the inclination angle of the steeply inclined sections 22b because the light incident angle with respect to the steeply inclined sections 22b increases. However, when the inclination angle of the steeply inclined sections 22b is decreased, it becomes more difficult for light emitted from the light source 21 to be emitted as the illumination light 22A directed downward. Moreover, since the illumination light 22A is emitted obliquely, illumination efficiency is reduced. Therefore, it is difficult to simultaneously achieve both an improvement in illumination efficiency and a reduction in leakage light.

Figure 9:
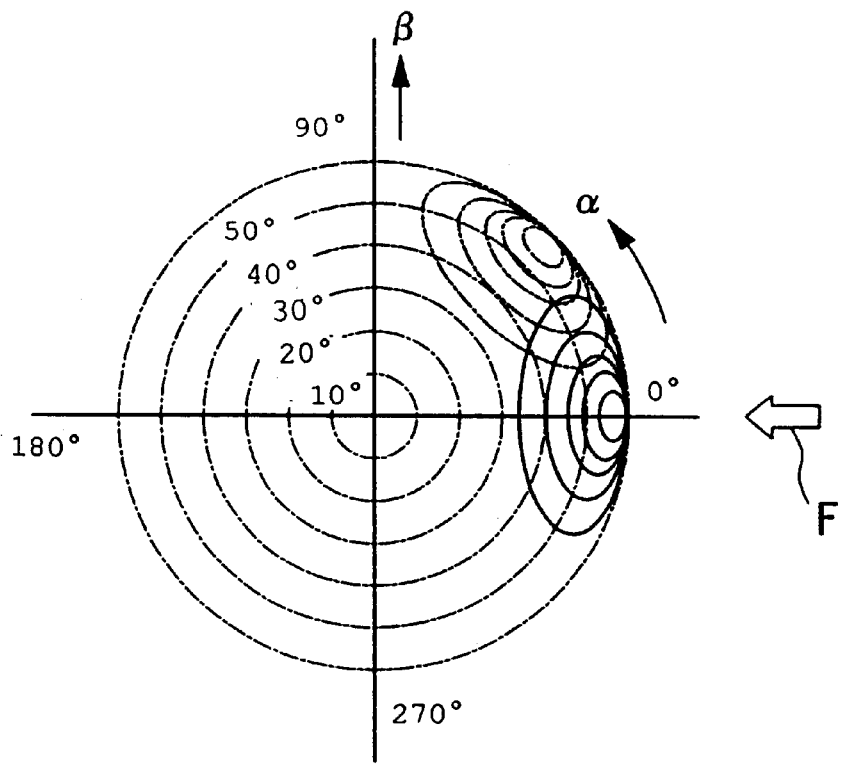
FIG. 9 is a graph showing the intensity distribution of leakage light in a front light.
Figure 10:
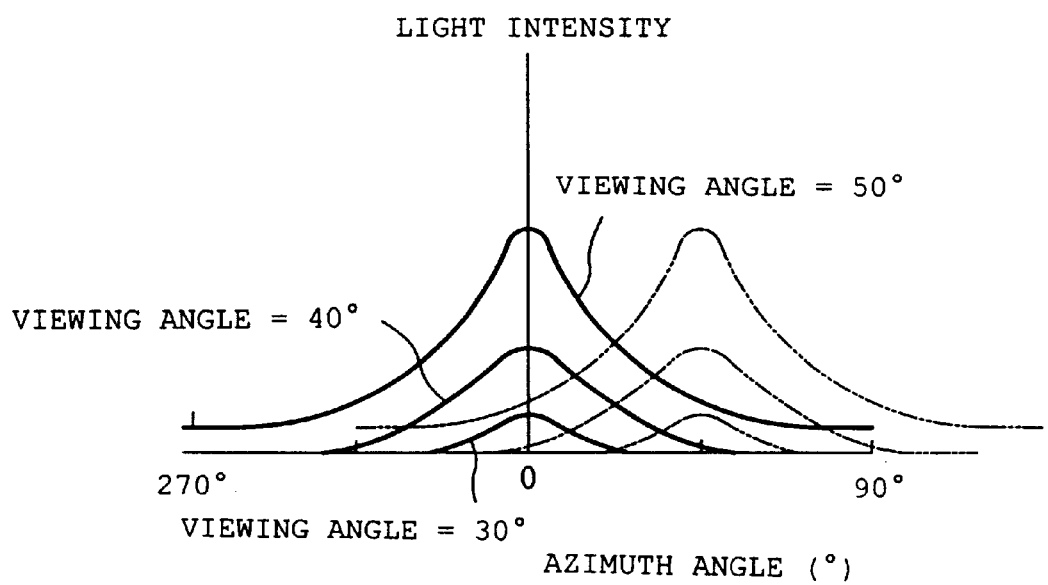
FIG. 10 is a graph showing the azimuth angle dependency of the leakage light intensity in the front light.
Figure 11:
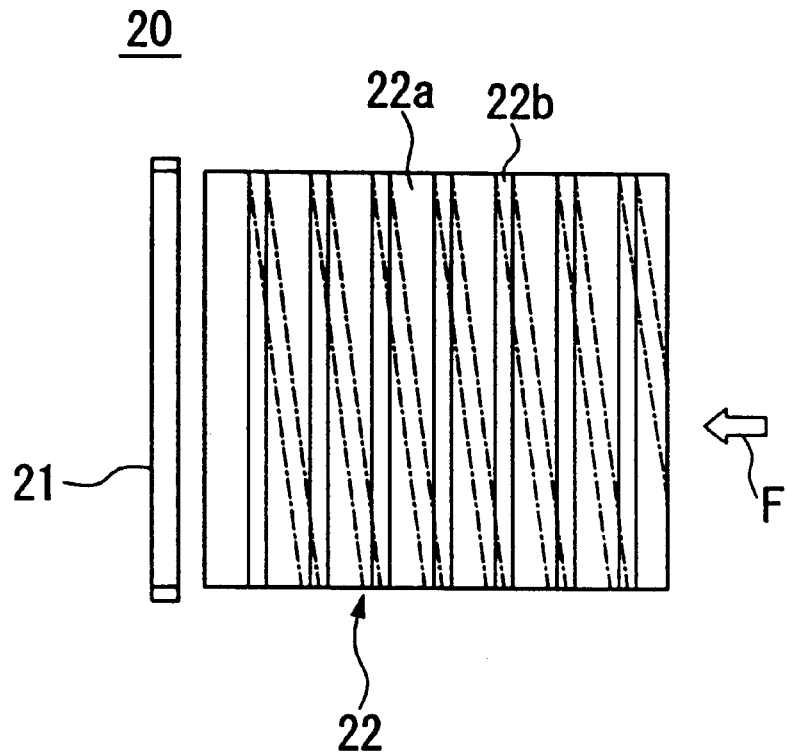
FIG. 11 is a general plan view schematically showing the conventional front light.

In general, when the above-described front light 20 is placed in front of the liquid crystal panel, since the illumination light 22A from the front light 20 has angular characteristics, the device is placed so as to be viewed from a slightly oblique direction at the right side in the figure. That is, it is most preferable, in effectively using the display brightness, to set the principal viewing direction F of the device as shown by the arrow. In such a setting, since the above-described leakage light 22B is also emitted in the viewing direction, a bright display is obtained, whereas visibility is deteriorated due to the leakage light 22B, and for example, the contrast is lowered. In FIG. 9, isointensity curves are shown by solid lines, which indicate an intensity distribution of the leakage light 22B in the emitting direction (an azimuth angle α, an angle β). In this figure, the azimuth angle a represents an angle in the counterclockwise direction relative to the principal viewing direction F, and the angle β represents an inclination angle with respect to the normal direction of the liquid crystal panel. FIG. 10 is a graph showing the relationship between the azimuth angle α and the emitting light intensity with respect to the angle β. In this figure, the azimuth angle α of the principal viewing direction is equal to 0°. Since the principal viewing direction F coincides with the intensity peak direction of the leakage light 22B in this way, visibility cannot be sufficiently improved. the light source 11. On the surface of the light guide plate 12, gently inclined sections 12a serving as transmissive face sections and steeply inclined sections 12b serving as reflective face sections are arranged in stripes in plan view so as to form cuneal projections connected at their projecting ends. These sections are repeatedly formed from right to left in the figure. A back surface 12c of the light guide plate 12 is flat.

Light emitted from the light source 11 enters the light guide plate 12 from the end face 12d and propagates to the right side in the figure. The light applied onto the steeply inclined sections 12b is totally reflected, and is emitted downward as illumination light 12A from the back surface 12c as before. A part of the light applied to the steeply inclined sections 12b is not totally reflected, but is obliquely emitted upward as leakage light 12B as before.

Figure 7A:
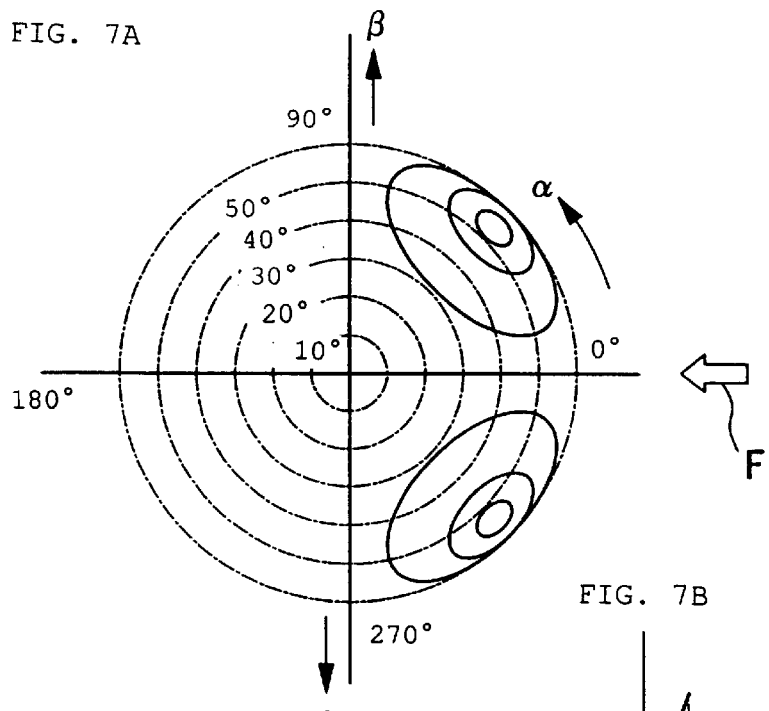
FIG. 7A is a graph showing the intensity distribution of leakage light in the first embodiment.
Figure 7B:
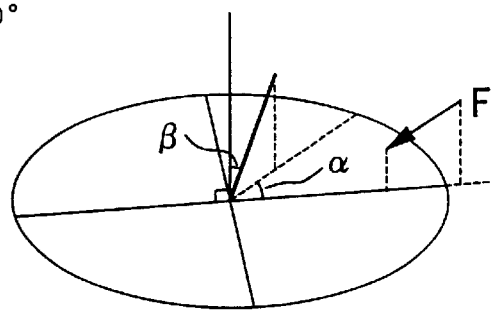
FIG. 7B is an explanatory view showing the graph shown in FIG. 7A.
Figure 8:
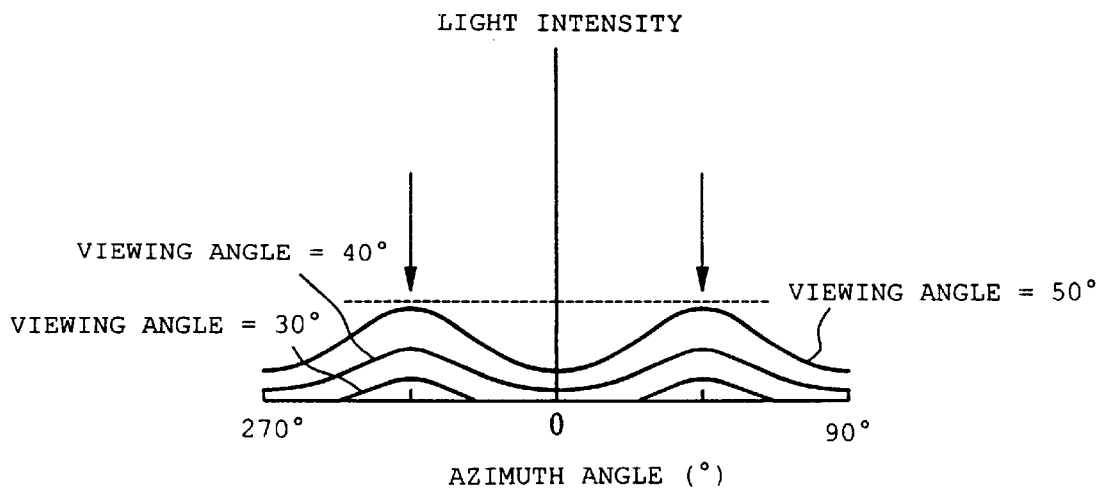
FIG. 8 is a graph showing the azimuth angle dependency of the leakage light intensity in the first embodiment.

In this embodiment, the steeply inclined sections 12b serving as reflective face sections include face portions 12b-1 (first faces) oriented obliquely with respect to a principal viewing direction F on the surface of the light guide plate 12, and face portions 12b-2 (second faces) oriented obliquely in the opposite direction from the faces 12b-1, as shown in FIG. 1. Since the face portions 12b-1 and 12b-2 have azimuth angles in the normal directions which differ from the viewing direction F, and are symmetrical with respect to the viewing direction F, they produce leakage lights 12B-1 and 12B-2 whose directional components are deviated from the principal viewing direction F to both sides on the surface of the light guide plate 12, as shown in FIG. 1. Therefore, the orientation distribution of the leakage light 12B differs from the conventional one, and the peak orientations of the leakage light 12B are formed on both sides of the viewing direction F, as shown in FIGS. 7A–B and 8. As shown in FIG. 1, for example, the angle between the leakage lights 12B-1 and 12B-2 is between 0° and 180°. Moreover, the peak intensities on both sides significantly decrease. For this reason, when viewed from the principal viewing direction F, deterioration of visibility due to leakage light 12B is not significantly seen. On the other hand, even when the viewing direction is changed slightly, since the absolute value of intensity of the leakage light 12B is lowered, visibility is not significantly deteriorated. Furthermore, since light components orthogonal to the travel direction of the light-source light are produced in the application direction of the illumination light 12A by the face portions 12b-1 and 12b-2, illumination can be performed so that the angle at which the illumination light is applied is not deviated, when viewed from the principal viewing direction F.

In this embodiment, since the two types of face portions 12b-1 and 12b-2 of the steeply inclined sections 12b are oriented in directions deviating toward both sides of the principal viewing direction, that is, since the steeply inclined sections 12b serving as acting faces are formed except in the plane orientation oriented toward the principal viewing direction F so as not to guide leakage light in the principal viewing direction, the leakage light 12B can be effectively reduced without significantly impairing the brightness of the display by the illumination light 12A. Since the face portions 12b-1 and 12b-2 are alternately and repeatedly formed, the transparency characteristics of the light guide plate 12 is not deteriorated, and uniformity of illumination light and transmitted light can be ensured. Moreover, even when the light guide plate 12 is formed by injection molding, a mold can be easily produced.

While the above-described face portions 12b-1 and 12b-2 are in contact with one another at sides thereof because they are formed of planes, they may also be formed of continuous curved surfaces.

(Second Embodiment)

Figure 3:
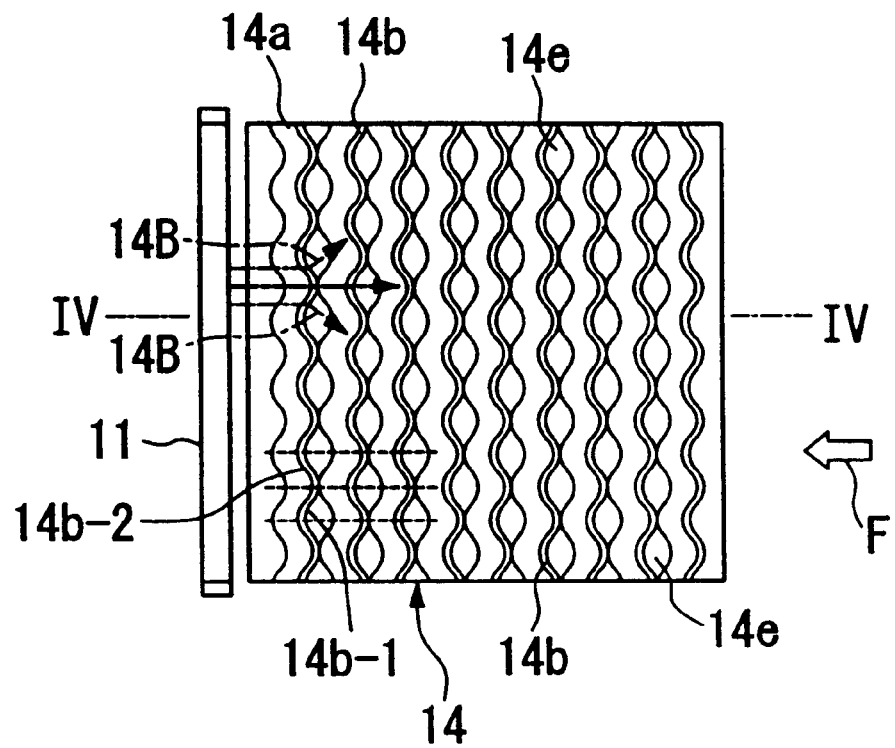
FIG. 3 is a general plan view schematically showing an illumination device according to a second embodiment of the present invention.
Figure 4:
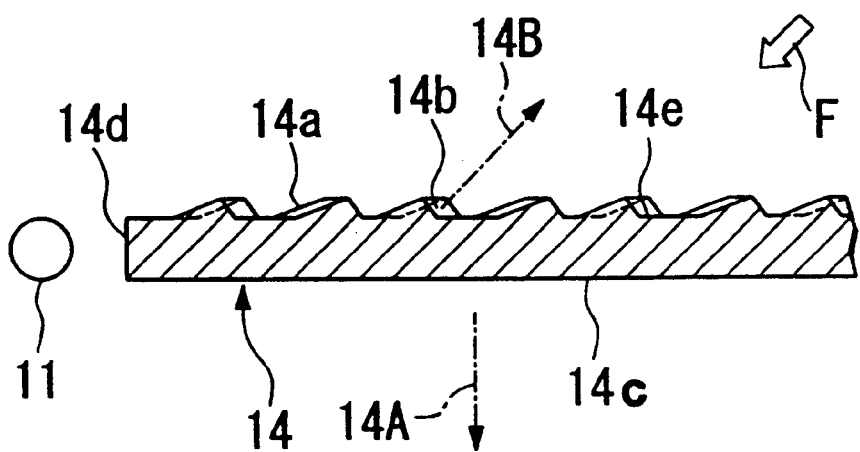
FIG. 4 is an enlarged general sectional view schematically showing the second embodiment.

Next, a front light serving as an illumination device according to a second embodiment of the present invention will be described with reference to FIGS. 3 and 4. FIG. 3 is a general plan view schematically showing the general structure of a front light serving as an illumination device according to the present invention, and FIG. 4 is a general sectional view schematically showing the general structure of the front light, taken along line IV—IV in FIG. 3. This embodiment is just the same as the above first embodiment, except in the form of the surface of a light guide plate 14. The surface of the light guide plate 14 includes gently inclined sections 14a serving as transmissive face portions and inclined at a substantially shallow angle, steeply inclined sections 14b serving as reflective face portions and steeply inclined adjacent to the tops of the gently inclined sections 14a, and flat face portions 14e locally formed between the steeply inclined sections 14b and the gently inclined sections 14a.

The gently inclined sections 14a and the steeply inclined sections 14b have a wavy boundary therebetween, when viewed in plan, as shown in FIG. 3. The steeply inclined sections 14b include first faces and second faces 14b-1 and 14b-2 sequentially and continuously formed across the crests of the waves. In the travel direction (the rightward direction in the figure) of light emitted from a light source 11, wavy bands constructed by the gently inclined sections 14a and the steeply inclined sections 14b are sequentially arranged while they are shifted up and down by half a cycle. For this reason, regions are formed between one wavy band and an adjoining wavy band, where both the bands separate from each other in accordance with the cycles of the waves. These regions serve as the above flat face portions 14e.

In this embodiment, the azimuth angle of the normals to the surfaces of the steeply inclined sections 14b cyclically and continuously changes through an angle width close to approximately 90° along the extending direction of the bands. For this reason, the leakage light 14B is also dispersed through the above angle width. Therefore, even when viewed from the principal viewing direction F, the peak shape is extremely gentle, and deterioration of visibility due to the leakage light 14B is prevented without impairing the brightness of the display by the illumination light 14A from the back surface 14c.

While the reflective face portions and the transmissive face portions may be repeatedly formed in the same cycle, when viewed in the light propagating direction of the light guide plate, as in the first embodiment, they may also be formed in different cycles, for example, in cycles shifted by half a cycle as in this embodiment. The reflective face portions need not extend in stripes, as described above, and they may be formed in various forms on the surface of the light guide plate, and for example, they may be dispersed on the plate.

(Third Embodiment)

Figure 5:
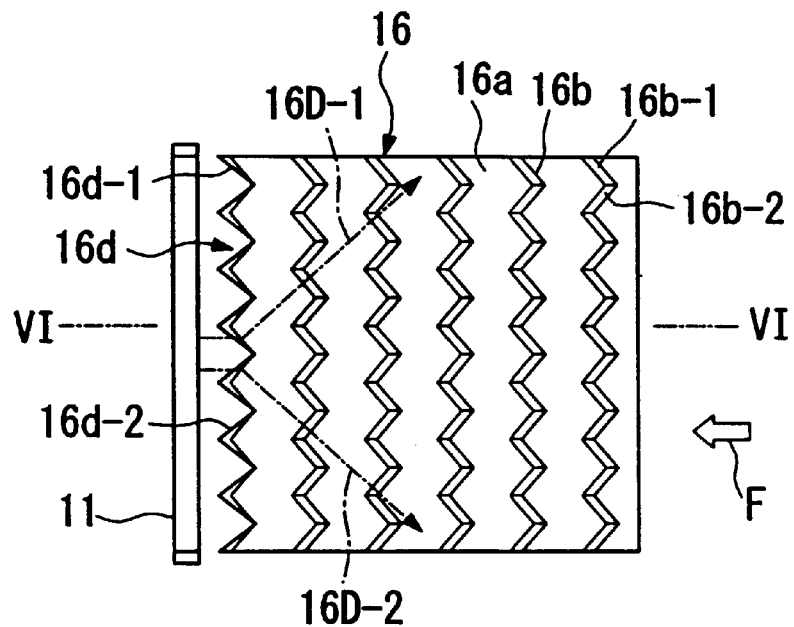
FIG. 5 is a general plan view schematically showing an illumination device according to a third embodiment of the present invention.
Figure 6A:
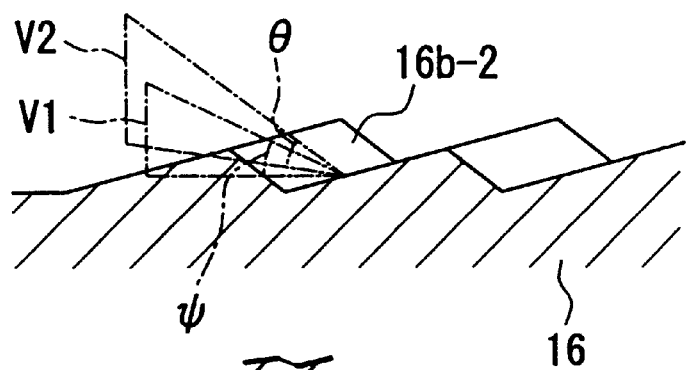
FIG. 6A is an enlarged partial sectional view showing the second embodiment.
Figure 6B:
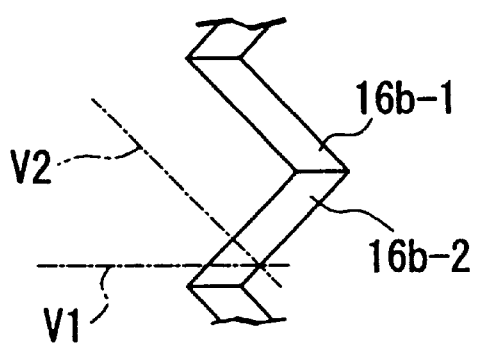
FIG. 6B is an enlarged partial plan view showing the second embodiment.

Next, a front light serving as a surface light-emitting device according to a third embodiment of the present invention will be described with reference to FIGS. 5 and 6A–B. FIG. 5 is a general plan view schematically showing the general structure of a front light serving as a surface light-emitting device according to the present invention, FIG. 6A is an enlarged general sectional view schematically showing the general structure of the front light, taken along line VI—VI in FIG. 5, and FIG. 6B is an enlarged plan view showing the surface shape of the front light shown in FIG. 5. In this embodiment, gently inclined sections 16a serving as transmissive face portions and steeply inclined sections 16b serving as reflective face portions are formed on the surface of a light guide plate 16, in a manner substantially similar to that in the first embodiment. The steeply inclined sections 16b include face portions 16b-1 (first faces) and 16b-2 (second faces) oriented in different directions. The face portions 16b-1 and 16b-2 are cyclically and alternately arranged in the extending direction of the steeply inclined sections 16b.

In this embodiment, an end face 16d serving as a light incident end face, from which light emitted from a light source 11 enters the light guide plate 16, is provided with end face portions 16d-1 and 16d-2 whose normal directions are different. The normal directions of the end face portions 16d-1 and 16d-2 are different so as to change the direction of light emitted from the light source 11 when entering the light guide plate 16, and to primarily separate the light propagating inside the light guide plate 16 into two propagating lights 16D-1 and 16D-2 traveling in different directions. The end face portions 16d-1 and 16d-2 and the face portions 16b-1 and 16b-2 are arranged so that the propagating light 16D-1 passes through the region of the steeply inclined section 16b where the face portion 16b-1 is formed, and so that the propagating light 16D-2 passes through the region of the steeply inclined section 16b where the face portion 16b-2 is formed.

According to such a configuration, in the light guide plate 16, most of the light, which is applied to the face portions 16b-1 and 16b-2 oriented in two different directions, is composed of the propagating lights 16D-1 and 16D-2 traveling from the direction along the maximum inclining directions of the face portions. Therefore, the actual inclination angle of the steeply inclined sections 16b can be made to act as an effective inclination angle for the propagating light.

That is, the face portions of the steeply inclined sections in the first embodiment shown in FIG. 1 act as if they were inclined at an angle lower than the actual inclination angle with respect to the light traveling from the light source 11 to the right side in the figure. Regarding the face portion 16b-2 formed obliquely with respect to the light travel direction, as shown in FIG. 6A–B, the inclination angle of the face portion 16b-2 is θ with respect to the light traveling in a direction on a vertical face V2 including the maximum inclination line of the face portion 16b-2, whereas it is ψ with respect to the propagating light of the first embodiment traveling in a direction on a vertical face V1 including the light travel direction rightward in the figure. This inclination angle ψ is smaller than the above-described angle θ.

Figure 12:
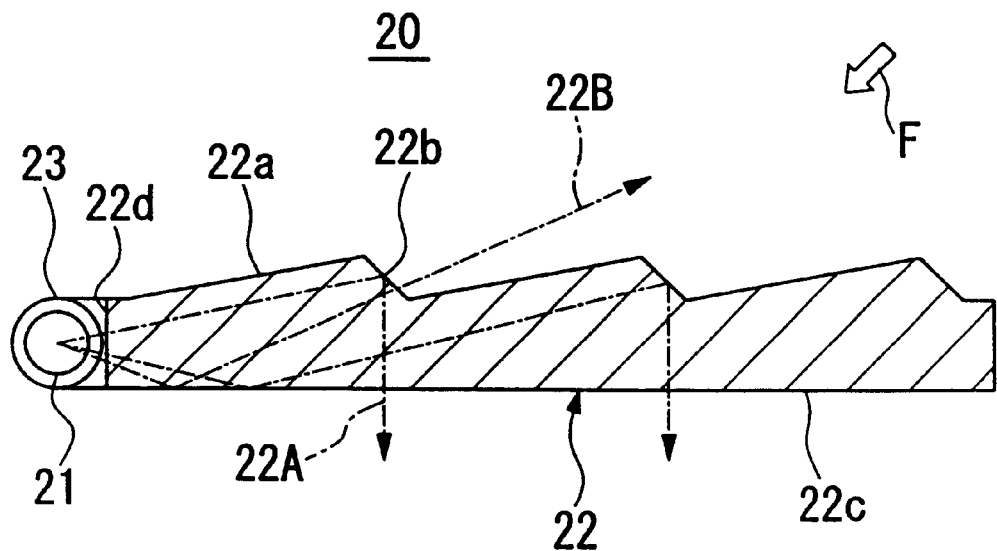
FIG. 12 is an enlarged general sectional view schematically showing the conventional front light.

On the other hand, since the inclination angle of the steeply inclined sections determines the emission characteristics of the illumination light 12A and the leakage characteristics of the leakage light 12B, it is precisely set in normal light guide plates so that illumination light efficiency is high and so that visibility is not deteriorated by leakage light. Therefore, in order to provide functions, similar to those of the inclined sections 22b of the conventional light guide plate 20 shown in FIG. 12, in the first embodiment, the inclination angle of the steeply inclined sections 12b shown in FIG. 1 must be greater than that in the conventional light guide plate.

However, this embodiment has a configuration in which the travel directions of light emitted from the light source 11 are almost collected in two directions by the end faces 16d, and the propagating light travels in the directions included in the vertical faces V2 including the maximum inclination lines of the face portions 16b-1 and 16b-2 and is applied onto the face portions. Therefore, it is possible to obtain, without changing the inclination angles of the face portions, advantages substantially similar to those in a case in which the inclination angles are changed. By doing this, most components of the emitted illumination light, which has been totally reflected by the face portions 16b-1 and 16b-2, are emitted perpendicularly to the back surface, which improves illumination light efficiency.

(Fourth Embodiment)

Figure 13:
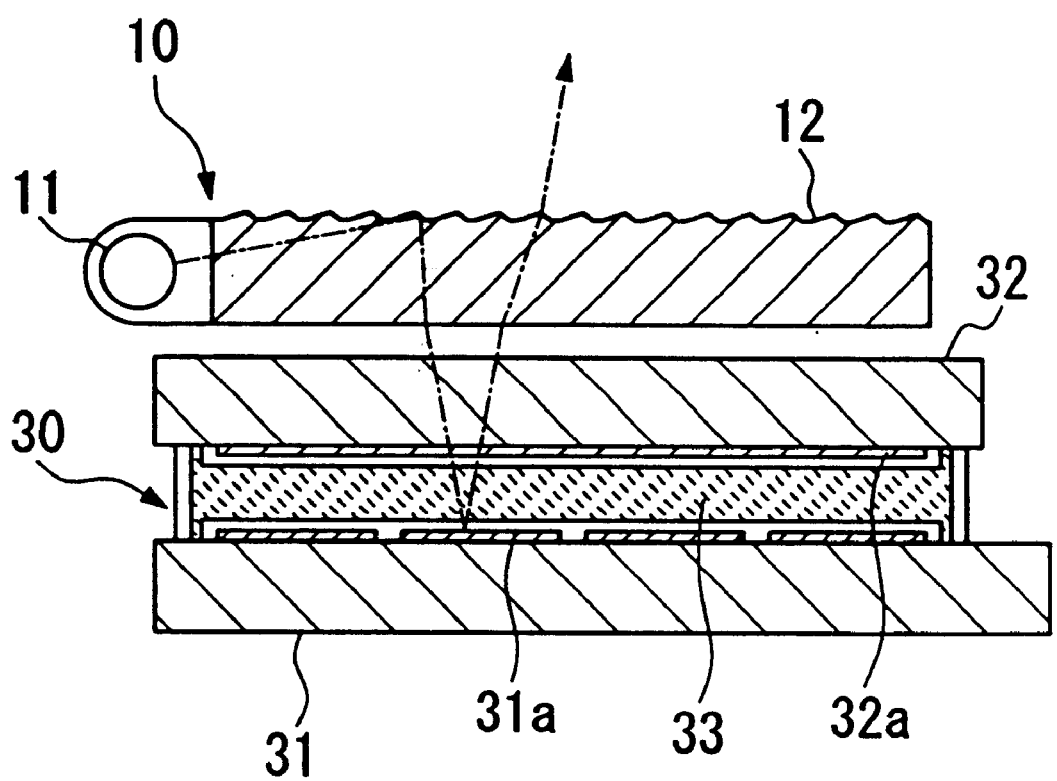
FIG. 13 is a view showing an example of a structure in which the illumination device according to the first to third embodiments is used as a front light in an electrooptical device.

FIG. 13 shows an example of an electrooptical device in which the illumination device in the above-described first embodiment is mounted as a front light. In this structural example, a front light 10 is placed in front of a reflective liquid crystal display device 30. In the reflective liquid crystal display device 30, liquid crystal is sealed as an electrooptic material in a liquid crystal cell formed by bonding a lower substrate 31 and an upper substrate 32 via a sealing member. Data signal electrodes 31a are formed on the inner side of the substrate 31 so as to also serve as reflecting films, and transparent scanning signal electrodes 32a are formed on the inner side of the opposing substrate 32. The data signal electrodes 31a and the scanning signal electrodes 32a are arranged in a matrix. By changing the voltage applied to the liquid crystal between both the electrodes, image formation is performed. A light guide plate 12 of the front light 10 is placed in front of the reflective liquid crystal display device 30 substantially corresponding to an effective display region of the reflective liquid crystal display device 30. While various optical elements, such as a polarizer, a scattering plate, and a retardation film, are disposed between the reflective liquid crystal display device and the front light 10, description and illustration thereof are omitted.

While the reflecting films are formed on the inner surface of the lower substrate 31 in this embodiment, they may also be formed on the outer side of the lower substrate 31.

While the scanning signal electrodes 32a are formed on the upper substrate 32 and the data signal electrodes 31a are formed on the lower substrate 31 in this embodiment, data signal line may also be formed on the upper substrate 32 and scanning signal lines may also be formed on the lower substrate 31.

While a so-called passive matrix liquid crystal display device is used in this embodiment, a so-called active matrix liquid crystal display device may also be suitably used, in which a three-terminal device represented by a TFT, or a two-terminal device represented by a TFD is formed on the substrate 31 or the substrate 32.

According to this embodiment, in a case in which the electrooptical device is used when the environment is bright, that is, when the illumination device is off, a user can see an image formed in the reflective liquid crystal display device by viewing, through the gently inclined sections 12a serving as transmissive face portions shown in FIG. 1, the image by the light that enters the light guide plate from the gently inclined sections 12a and is reflected by the reflective films 31a.

In contrast, in a case in which the electrooptical device is used when the environment is dim, that is, when the illumination light is on, the user can view an image formed in the reflective liquid crystal display device by viewing, through the gently inclined sections 12a serving as transmissive face portions, the image by the light that enters the reflective liquid crystal display device by being reflected by the steeply inclined sections 12b serving as reflective face sections and is reflected by the reflective films 31a.

According to the electrooptical device of this embodiment, the steeply inclined sections 12b serving as reflective face sections include, as shown in FIG. 1, the face portions 12b-1 (first faces) oriented obliquely with respect to the principal viewing direction F on the surface of the light guide plate 12, and the face portions 12b-2 (second faces) oriented obliquely toward the side opposite from the face portions 12b-1. The face portions 12b-1 and 12b-2 have azimuth angles in the normal directions which differ from the principal viewing direction F, and are symmetrical with respect to the viewing direction F. Therefore, the leakage lights 12B-1 and 12B-2 containing directional components deviated from the principal viewing direction F toward both sides on the light guide plate 12 are formed, as shown in FIG. 1, and the orientation distribution of the leakage light 12B differs from the conventional one. As shown in FIGS. 7A–B and 8, the peak orientations of the leakage light 12B are formed on both sides of the viewing direction, and the peak intensities on both sides significantly decrease. For this reason, when viewed from the principal viewing direction F, deterioration of visibility due to the leakage light 12B is not significantly seen. On the other hand, even when the viewing direction is changed slightly, since the absolute value of intensity of the leakage light 12B is lowered, visibility is not significantly deteriorated. Furthermore, since light components orthogonal to the travel direction of the light-source light are produced in the application direction of the illumination light 12A by the face portions 12b-1 and 12b-2, illumination can be performed so that the angle at which the illumination light is applied is not deviated, when viewed from the principal viewing direction F.

In this embodiment, since the two types of face portions 12b-1 and 12b-2 of the steeply inclined sections 12b are oriented in the directions deviating toward both sides of the principal viewing direction, that is, since the steeply inclined sections 12b serving as reflective face sections are formed except in the plane orientation oriented toward the principal viewing direction F so as not to guide leakage light in the principal viewing direction, the leakage light 12B can be effectively reduced without significantly decreasing the brightness of the display by the illumination light 12A. Since the face portions 12b-1 and 12b-2 are alternately and repeatedly formed, the transparency characteristics of the light guide plate 12 is not deteriorated, and uniformity of illumination light and transmitted light can be ensured. Moreover, even when the light guide plate 12 is formed by injection molding, a mold can be easily produced.

While the illumination device described in the first embodiment is used as a front light in this embodiment, even when the illumination device of the second embodiment and the illumination device of the third embodiment are used as a front light in an electrooptical device, the functions and advantages similar to those in this embodiment can be obtained.

(Fifth Embodiment)

Next, electronic equipment having the electrooptical device of the present invention as a display will be described with reference to FIGS. 14A–C. This embodiment includes various electronic equipments to which the electrooptical device of the fourth embodiment is applied as a display.

Figure 14A:
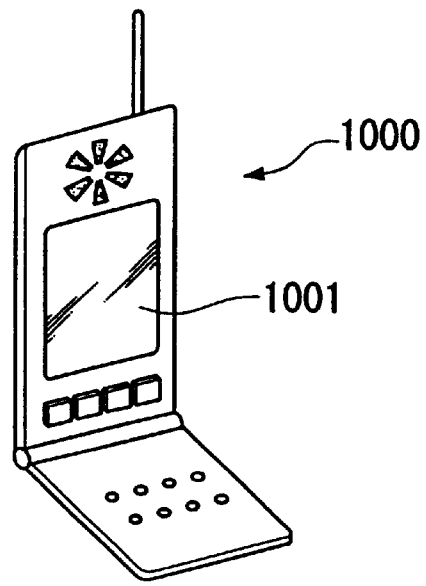
FIGS. 14A to 14C are external views of various electronic equipment according to a fifth embodiment of the present invention.

By applying the electrooptical device of the fourth embodiment, for example, to a display section 1001 of a portable telephone 1000 shown in FIG. 14A, a portable telephone is achieved which is visible both in the night and in the daytime, and in particular, which provides good visibility when the illumination device is on. Image signals to be supplied to the reflective liquid crystal display device 30 are input through various input devices (not shown). Specific examples of the input devices or the portable telephone are dial buttons, and a signal sending circuit for converting received signals into image signals and sending the image signals to the reflective liquid crystal display device.

Figure 14B:
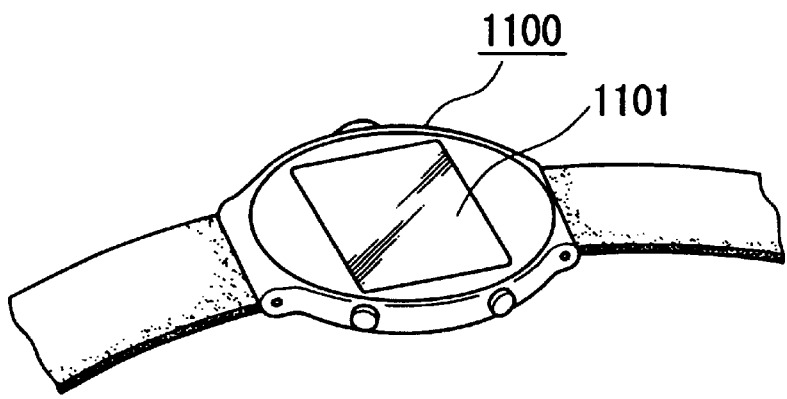

The application to a display section 1101 of a wristwatch 1100 shown in FIG. 14B achieves a wristwatch which is visible both in the night and in the daytime, in particular, which provides good visibility when the illumination device is on. Image signals to be supplied to the reflective liquid crystal display device 30 are input through input devices. As an example of input devices for the wristwatch, a signal sending circuit is given, which primarily converts clock signals into image signals and sends the image signals to the reflective liquid crystal display device.

Figure 14C:
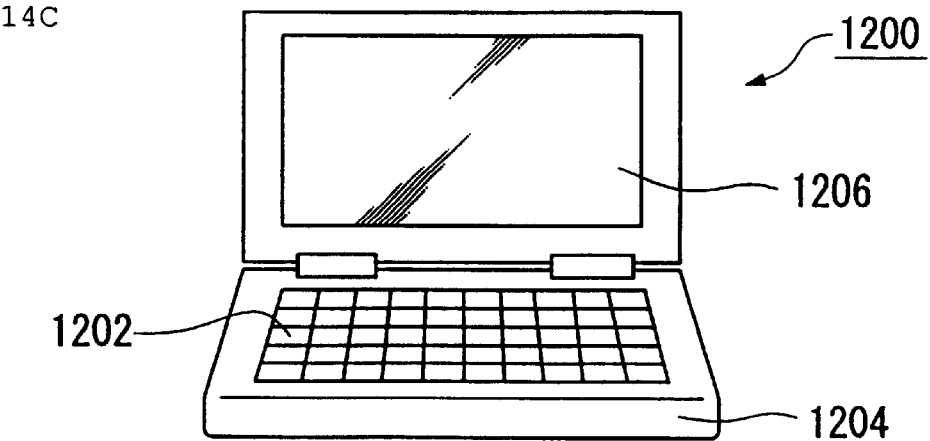

The application to a display screen 1206 in a cover, which is mounted to a main body 1204 with a keyboard 1202 so as to open and close, in a personal computer (or an information terminal) 1200 shown in FIG. 14C achieves a personal computer which is visible night and day, in particular, which provides good visibility when the illumination device is on. In the case of the personal computer, image signals to be supplied to the reflective liquid crystal display device 30 are primarily determined based on signals input from the keyboard 1202.

While there are provided, in the above embodiments, the acting face sections including two types of face portions having different normal directions on the plate with respect to the initial travel direction of light emitted from the light source or the principal viewing direction F, or the acting face sections whose normal direction continuously changes, more than three face portions having different normal directions may be provided. The face portions and the acting face sections need not be formed cyclically and continuously as in the above embodiments, and they may be arranged at random or may be otherwise distributed.

As described above, in the illumination device of the present invention, even if leakage light leaks from the reflective face section toward the viewer, since the reflective face section has a predetermined plane orientation distribution, for example, including a plurality of face portions having different planar orientations, or the acting face sections include curved face portions whose plane orientation gradually changes, the emitting direction of the leakage light is not limited to a fixed direction, but is dispersed. Therefore, visibility is prevented from being deteriorated due to leakage light. By mounting the illumination device as a front light, various electrooptical devices and electronic equipment with good visibility can be provided.

What is claimed is:

1. An illumination device, comprising:

a light source; and a light guide plate having an end face, a first surface and a second surface opposing the first surface, the light guide plate introducing light emitted from said light source from the end face and emitting the light from the first surface, the second surface of said light guide plate having a reflective face section for reflecting the light from said light source toward said first surface or emitting the light from said second surface according to an incident angle of the light, said reflective face section including at least a first face and a second face, and an emitting direction of the light emitted from said first face differing from an emitting direction of the light emitted from said second face.

2. The illumination device according to claim 1, an angle formed by the emitting direction of light projected onto the second surface of said light guide plate and emitted from said first face and the emitting direction of light projected onto the second surface of said light guide plate and emitted from said second face being within 0° and 180°.

3. The illumination device according to claim 1, said first face and said second face being formed alternately and continuously.

4. The illumination device according to claim 1, said light guide plate being made of a substantially transparent material, and said reflective face section being formed of an inclined surface disposed at a predetermined angle with respect to a plane parallel to said first surface.

5. An electrooptical device, comprising:

an electrooptical element having an electrooptical layer disposed between a pair of substrates and a reflective film disposed on one side of said electrooptical layer; and an illumination device placed on a viewer side of said electrooptical element, and including a light source and a light guide plate that introduces light emitted from said light source from an end face and principally emitting the light toward said electrooptical element, said light guide plate having a viewer-side surface on the viewer side provided with a reflective face section for reflecting the light emitted from said light source toward said electrooptical element or emitting the light from said viewer-side surface according to an incident angle of the light, and a transmissive face section for allowing said electrooptical element to be visible therethrough from the viewer side, and said reflective face section including a first face and second face, an emitting direction of the light emitted from said first face differing from an emitting direction of the light emitted from said second face.

6. The electrooptical device according to claim 5, an angle formed by the emitting direction of light projected onto the viewer-side surface of said light guide plate and emitted from said first face and the emitting direction of light projected onto the viewer-side surface of said light guide plate and emitted from said second face being within 0° and 180°.

7. The electrooptical device according to claim 5, said first face and said second face being formed alternately and continuously.

8. The electrooptical device according to claim 5, said light guide plate being made of a substantially transparent material and further having a back surface opposing the viewer-side surface, and said reflective face section being formed of an inclined surface disposed at a predetermined angle with respect to a plane parallel to said back surface.

9. An electronic equipment that comprises an electrooptical device as a display section, and an input device that supplies an image signal to said electrooptical device, said electrooptical device comprising:

an electrooptical element having an electrooptical layer disposed between a pair of substrates and a reflective film disposed on one side of said electrooptical layer; and an illumination device placed on a viewer side of said electrooptical element, and including a light source and a light guide plate that introduces light emitted from said light source from an end face and principally emitting the light toward said electrooptical element, said light guide plate having a viewer-side surface on the viewer side provided with a reflective face section for reflecting the light emitted from said light source toward said electrooptical element or emitting the light from said viewer-side surface according to an incident angle of the light, and a transmissive face section for allowing said electrooptical element to be visible therethrough from the viewer side, and said reflective face section including a first face and second face, an emitting direction of the light emitted from said first face differing from an emitting direction of the light emitted from said second face.

10. The electronic equipment according to claim 9, an angle formed by the emitting direction of light projected onto the viewer-side surface of said light guide plate and emitted from said first face and the emitting direction of light projected onto the viewer-side surface of said light guide plate and emitted from said second face being within 0° and 180°.

11. The electronic equipment according to claim 9, said first face and said second face being formed alternately and continuously.

12. The electronic equipment according to claim 9, said light guide plate being made of a substantially transparent material and further having a back surface opposing the viewer-side surface, and said reflective face section being formed of an inclined surface disposed at a predetermined angle with respect to a plane parallel to said back surface.

* * * * *